April 15, 1924.

J. H. HERMANCE 1,490,511

TIME CONTROLLED MECHANISM

Filed Nov. 16, 1922    2 Sheets-Sheet 1

Inventor:
J Henry Hermance.
By Milo B. Stevens
Attorney

April 15, 1924.
J H. HERMANCE
1,490,511
TIME CONTROLLED MECHANISM
Filed Nov. 16, 1922   2 Sheets-Sheet 2
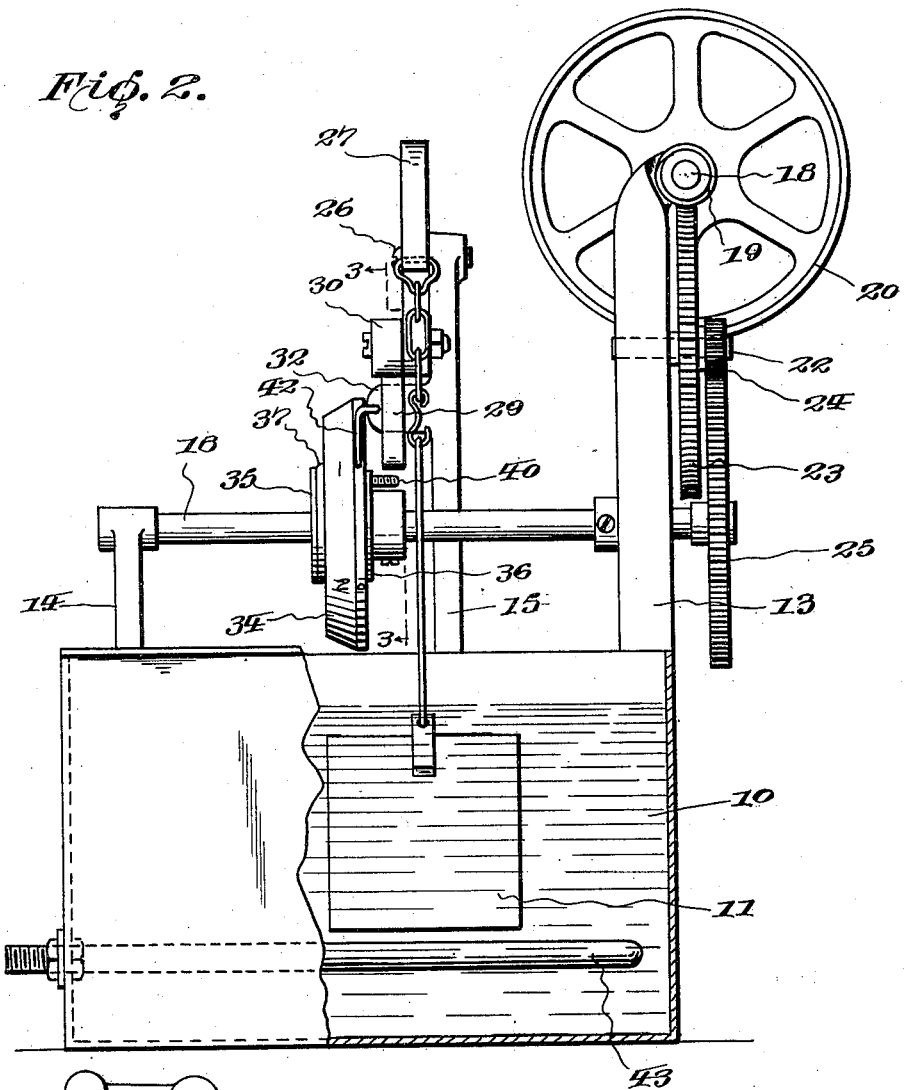
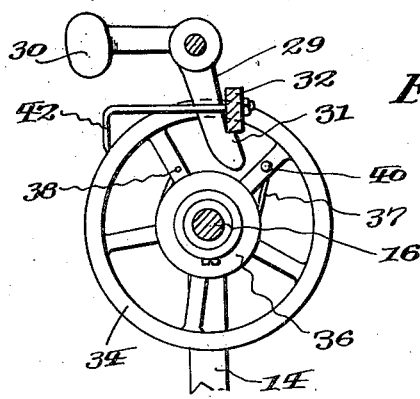
Inventor:
J Henry Hermance.
By Milo B Stevens
Attorneys Patented Apr. 15, 1924.

1,490,511

UNITED STATES PATENT OFFICE.

J HENRY HERMANCE, OF HOT SPRINGS, ARKANSAS.

TIME-CONTROLLED MECHANISM.

Application filed November 16, 1922. Serial No. 601,365.

*To all whom it may concern:*

Be it known that I, J HENRY HERMANCE, a citizen of the United States, residing at Hot Springs, in the county of Garland and State of Arkansas, have invented new and useful Improvements in Time-Controlled Mechanisms, of which the following is a specification.

This invention relates to time controlled mechanism employed in connection with culinary apparatus, such as egg-boilers and the like, whereby the eggs or other articles of food are kept immersed in boiling water for a predetermined period of time, and are then automatically removed from the water.

The invention has for its object to provide a very simple and efficient mechanism of the kind stated, and one embodying certain novel and improved details of construction and modes of operation to be hereinafter described and claimed.

Figure 1:
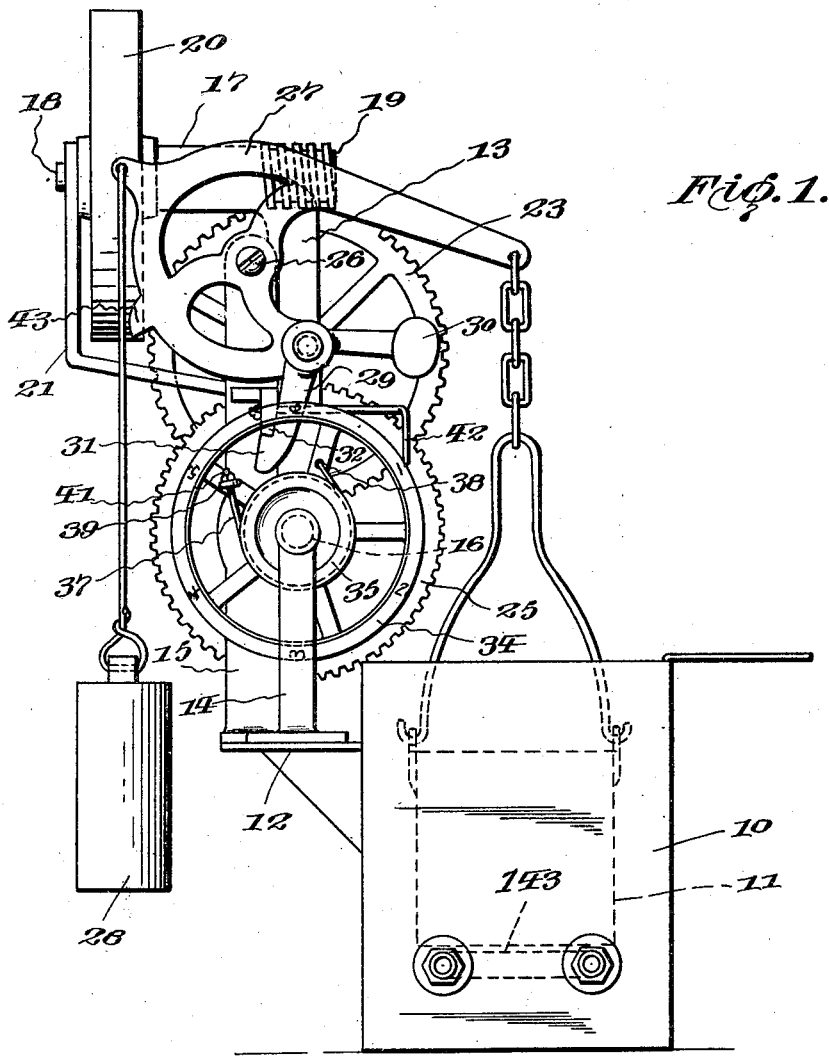
Figure 4:
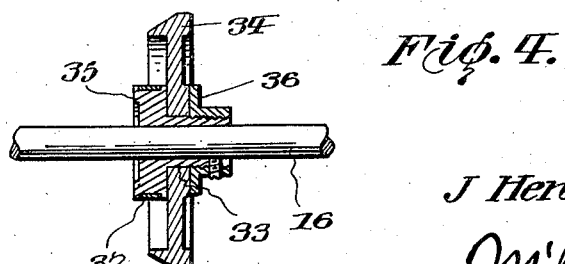

In order that the invention may be better understood, reference is had to the accompanying drawings, wherein:

Figure 1 is an end view of the apparatus; Fig. 2 is a front elevation, partly broken away; Fig. 3 is a section on the line 3—3 of Fig. 2, and Fig. 4 is a horizontal cross-section of a timing wheel.

The reference numeral 10 in the drawings denotes a tank adapted to contain a supply of boiling water into which are dipped or immersed one or more receptacles containing the eggs or other articles of food to be boiled or cooked. The drawings show one of these receptacles at 11, and it is to be understood that any number of such may be provided.

At the rear of the tank is a shelf 12 which supports standards 13, 14 and 15. The standards 13 and 14 have bearings in which is journaled a horizontal shaft 16. The standard 13 also has a bearing 17 for the shaft 18 of a worm 19, the latter being on one end of the shaft, and there being fast on the other end of the shaft a drive pulley 20 which will be belted to any suitable power source, such as an electric motor (not shown). The last mentioned end of the shaft is also supported by a bearing bracket 21 carried by the standard 13.

The standard 13 also supports a stationary shaft 22 on which is mounted a worm wheel 23 which is in mesh with the worm 19. Connected to the worm wheel 23 to turn therewith, is a pinion 24 which is in mesh with a spur gear 25 fast on the shaft 16. These parts constitute a reducing gear for driving the shaft 16 at a slow and uniform rate of speed.

The standard 15 pivotally supports, as shown at 26, a lever 27, one end of which latter overhangs the tank 10 and from which end is suspended the receptacle 11. The other end of the lever carries a weight 28.

The lever 27 also carries a pivoted detent 29 in the shape of an angle lever, one of the arms being weighted, as shown at 30, and the other arm having a hook 31 which is adapted to engage an arm 32 extending laterally from the standard 15, said arm therefore serving as a keeper for the detent, and the weight 30 serving to hold the hook in engagement with said keeper. The purpose of the detent is to hold the lever 27 tilted or swung in a direction to hold the receptacle 11 immersed in the contents of the tank 10.

On the shaft 16 is fixed a sleeve 33 which carries a timing wheel 34. One end of this sleeve is formed with a brake drum 35 and its other end is screw-threaded to receive a nut 36. The wheel 34 is loosely located on the sleeve 33, between the nut 36 and one side of the drum 35.

In order that the motion of the sleeve 33 may be communicated to the wheel 34, the latter carries a brake strap 37 which frictionally engages the grooved periphery of the drum 35. One end of the strap 37 is anchored to one of the spokes of the wheel, as shown at 38, and its other end passes through an eye 39 in one end of a pin 40 carried by another spoke and passing transversely therethrough. The last-mentioned end of the strap is threaded to receive a nut 41, which, when it is screwed up against the pin, adjusts the tension of the strap. The strap will be so adjusted that the wheel 34 rotates with the sleeve 33 when the shaft 16 is in motion, without however interfering with or preventing the wheel from being angularly adjusted or rotated relative to the sleeve, for a purpose to be presently described. The detent 29 is in the path of the pin 40 and is adapted to be tripped by the same off its keeper 32.

The wheel 34 has its periphery inscribed with a series of numbers, running from 1 to 6, and the arm 32 carries a pointer 42 which is adapted to indicate on said numbers.

In use, the tank is filled with boiling water; or the water in the tank is brought to and kept at a boiling point by any suitable means, such as a steam heating coil 143. The eggs or other articles are placed in the receptacle 11 which is then lowered into the tank and immersed in the boiling water. The wheel 34 should be rotated on the sleeve 33 until the number on its periphery indicating the number of minutes the receptacle is to remain immersed, is opposite the pointer 42. The lever 27 is held down by the detent 29 to keep the receptacle immersed. Upon starting the motor, the wheel 34 will start to turn, and when the pin 40 reaches the detent 29, the latter is tripped, whereupon the lever is released and it is then tilted by the weight 28 in a direction to take the receptacle out of the tank. The numerals on the wheel 34 are so arranged that the distance between each represents one minute of time. Thus if the receptacle is to remain immersed three minutes the wheel must be turned until the numeral 3 is opposite the pointer 42.

The apparatus is very simple in construction, and as it has no complicated parts liable to get out of order, it is reliable and efficient in operation.

The lever 27 has a stop lug 43 which is engageable with the arm 32 to limit the swing of the lever in a direction to take the receptacle 11 out of the tank 10.

I claim:

1. A time controlled mechanism comprising a standard having an arm, a weight actuated lever carried by said standard, a holding member pivoted to said lever, and having a weight normally holding the same in engagement with said arm, a rotatable actuating member having a laterally projecting pin to engage and release said holding member, a driving sleeve connected to said actuating member, and a brake connected to said pin and being trained about said sleeve.

2. A time controlled mechanism comprising a receptacle, a standard associated with the receptacle, a weight actuated lever carried by said standard, a container supported solely by said lever and positioned in said receptacle, said standard being provided with a laterally projecting arm, a holding member pivotally carried by said lever and having one end engaged with said arm and having its other end provided with a weight, a rotatable actuating member having means to engage said holding member, driving means supporting said actuating member, a brake band carried by said actuating member and being trained about said driving means, and an indicator carried by said arm and disposed adjacent said actuating member.

In testimony whereof I affix my signature.

J HENRY HERMANCE.